(12) United States Patent
Kikuchi et al.

(10) Patent No.: US 11,932,956 B2
(45) Date of Patent: Mar. 19, 2024

(54) ALUMINUM MEMBER AND METHOD OF MANUFACTURING THE SAME

(71) Applicant: UACJ CORPORATION, Tokyo (JP)

(72) Inventors: Mihoko Kikuchi, Tokyo (JP); Junji Nunomura, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 854 days.

(21) Appl. No.: 17/024,613

(22) Filed: Sep. 17, 2020

(65) Prior Publication Data

US 2021/0002783 A1    Jan. 7, 2021

Related U.S. Application Data

(63) Continuation of application No. PCT/JP2019/012582, filed on Mar. 25, 2019.

(30) Foreign Application Priority Data

Mar. 28, 2018    (JP) ................. 2018-062726

(51) Int. Cl.
*C23C 30/00* (2006.01)
*B32B 15/04* (2006.01)
(Continued)

(52) U.S. Cl.
CPC .............. *C25D 11/08* (2013.01); *B32B 15/04* (2013.01); *B32B 15/20* (2013.01); *C23C 30/00* (2013.01);
(Continued)

(58) Field of Classification Search
CPC ......... C25D 11/08; C25D 11/04; C25D 11/10; C25D 11/16; C23C 30/00; C23C 30/005;
(Continued)

(56) References Cited

U.S. PATENT DOCUMENTS

| | | | |
|---|---|---|---|
| 2002/0164909 A1 | 11/2002 | Matsuda et al. | |
| 2004/0053020 A1 | 3/2004 | Mashiko et al. | |
| 2019/0161881 A1 | 5/2019 | Nunomura | |
| 2021/0348293 A1* | 11/2021 | Nunomura | C25D 11/08 |

FOREIGN PATENT DOCUMENTS

| | | |
|---|---|---|
| CN | 1386915 A | 12/2002 |
| CN | 1500372 A | 5/2004 |

(Continued)

OTHER PUBLICATIONS

English translation of International Preliminary Report on Patentability for Application No. PCT/JP2019/012582, dated Sep. 29, 2020.

(Continued)

*Primary Examiner* — Michael E. La Villa
(74) *Attorney, Agent, or Firm* — Dorsey & Whitney LLP

(57) ABSTRACT

An aluminum member includes: a base material made of aluminum or an aluminum alloy; and an anodized coating including a barrier layer on a surface of the base material and a porous layer on the barrier layer, wherein the anodized coating contains phosphorus (P) and sulfur (S), and has a thickness of 100 μm or less, and, in a depth direction heading from a surface of the anodized coating toward the base material, a depth providing a maximum content of S in a region situated at a depth of 500 nm or more from the surface of the anodized coating is larger than a depth providing a maximum content of P, and an inequality (the maximum content of S)>(the maximum content of P) holds.

5 Claims, 4 Drawing Sheets

(51) Int. Cl.
*B32B 15/20* (2006.01)
*C25D 7/10* (2006.01)
*C25D 9/12* (2006.01)
*C25D 11/04* (2006.01)
*C25D 11/08* (2006.01)
*C25D 11/10* (2006.01)
*C25D 11/16* (2006.01)

(52) U.S. Cl.
CPC .......... *C23C 30/005* (2013.01); *C25D 11/04* (2013.01); *C25D 11/10* (2013.01); *C25D 11/16* (2013.01); *Y10T 428/12438* (2015.01); *Y10T 428/1259* (2015.01); *Y10T 428/12597* (2015.01); *Y10T 428/12604* (2015.01); *Y10T 428/12611* (2015.01); *Y10T 428/12618* (2015.01); *Y10T 428/12667* (2015.01); *Y10T 428/12736* (2015.01); *Y10T 428/12993* (2015.01); *Y10T 428/26* (2015.01); *Y10T 428/263* (2015.01); *Y10T 428/264* (2015.01); *Y10T 428/265* (2015.01)

(58) Field of Classification Search
CPC .............. B32B 15/04; B32B 15/20; Y10T 428/12438; Y10T 428/1259; Y10T 428/12597; Y10T 428/12604; Y10T 428/12611; Y10T 428/12618; Y10T 428/12667; Y10T 428/1266; Y10T 428/12736; Y10T 428/12993; Y10T 428/265; Y10T 428/264; Y10T 428/263; Y10T 428/26
See application file for complete search history.

(56) References Cited

FOREIGN PATENT DOCUMENTS

| | | | |
|---|---|---|---|
| CN | 109837579 A | 6/2019 | |
| EP | 1967616 A1 * | 9/2008 | ............. C25D 11/18 |
| JP | S60215795 A | 10/1985 | |
| JP | 2000226694 A | 8/2000 | |
| JP | 2017025384 A | 2/2017 | |
| JP | 2017122267 A | 7/2017 | |
| JP | 6474878 B1 | 2/2019 | |
| TW | 593786 B | 6/2004 | |

OTHER PUBLICATIONS

English translation of Written Opinion for Application No. PCT/JP2019/012582, dated Jul. 2, 2019.
Written Decision on Registration for Korean Patent Application No. 10-2020-7022163, dated Apr. 25, 2023, pp. all.
English translation of International Search Report and Written Opinion (EN translation of ISR only) for PCT Application No. PCT/JP2019/012582, datad Jul. 2, 2019.
English translation of Office Action for JP Application No. 2018-062726, dated Jul. 1, 2019.
Abrahami, Shoshan T. et al., "Interface Strength and Degradation of Adhesively Bonded Porous Aluminum Oxides", npj Materials Degradation, published online Aug. 21, 2017, 8 pages.
Ito, Seisiro et al., "Electrolytic White Coloring of Anodic Oxide Film on Aluminum in Al3+ Electrolytic Bath", Journal of the Japan Society of Colour Material, in particular, p. 7, summary, p. 8, 2.1 Andoic oxide film, vol. 61, 1988, 7-11.
[English Translation] First Office Action for Chinese Patent Application No. 201980010889.2 dated Nov. 18, 2022, pp. all.

* cited by examiner

[Figure 1]
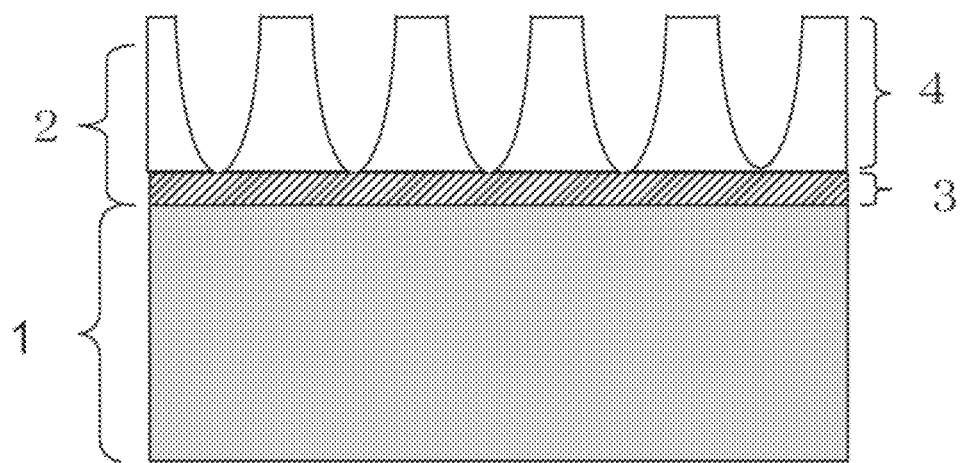

[Figure 2]
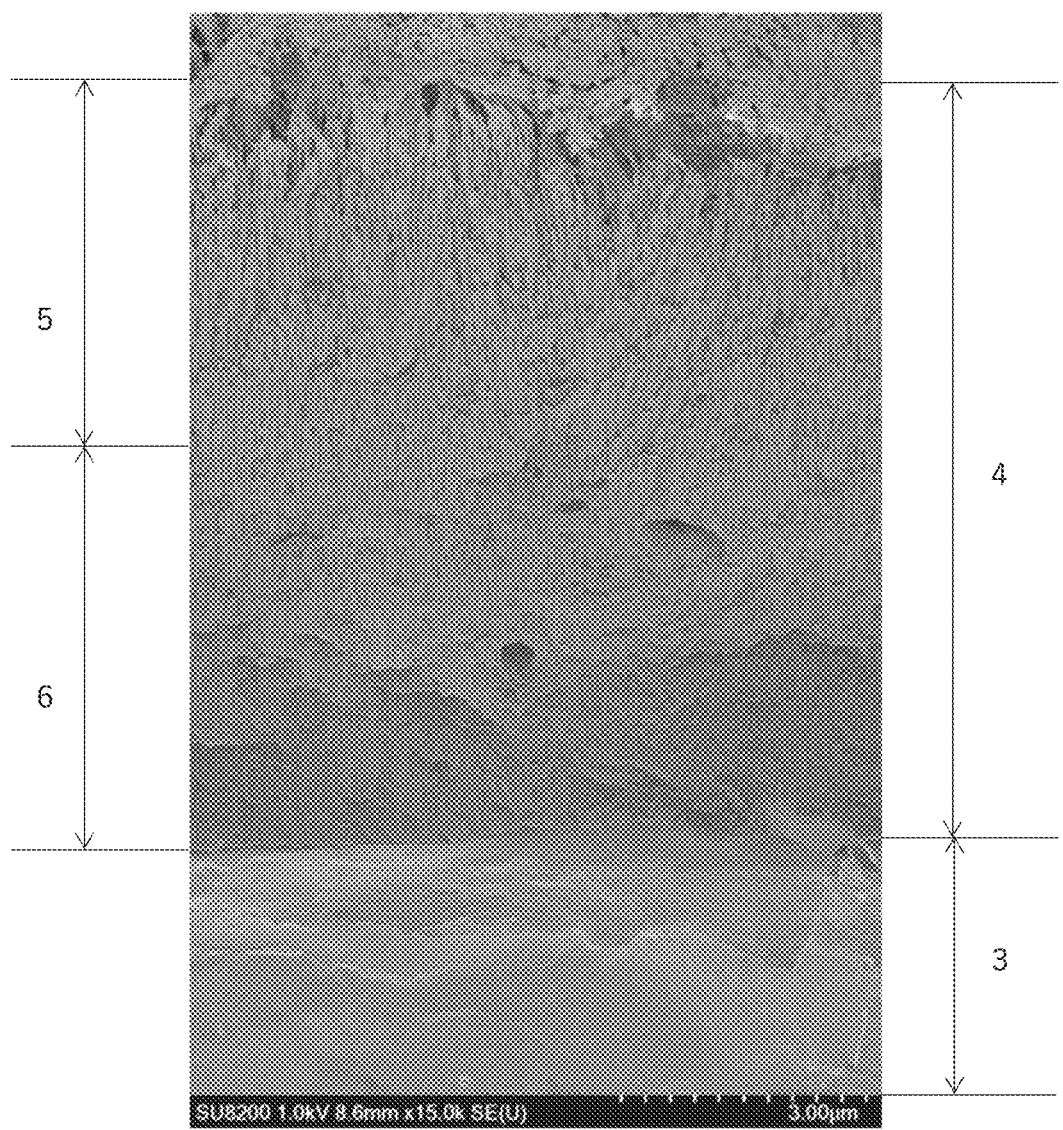

[Figure 3]
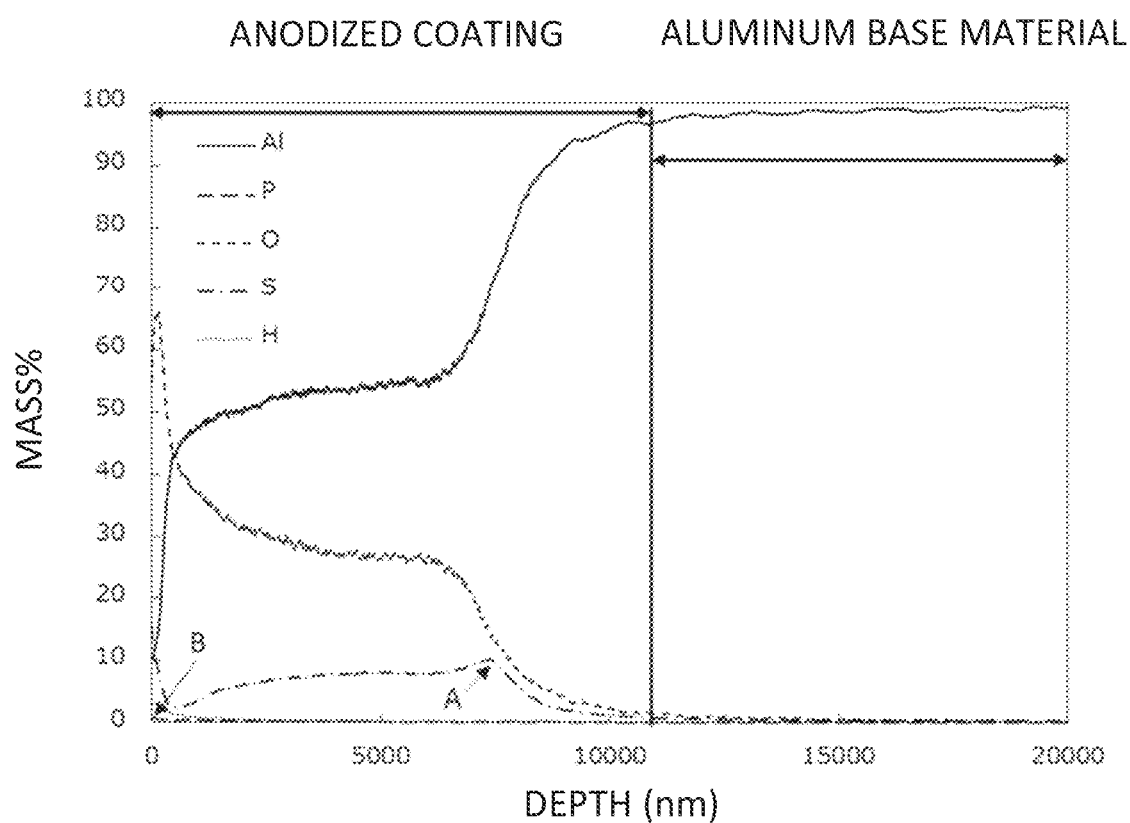

[Figure 4A]
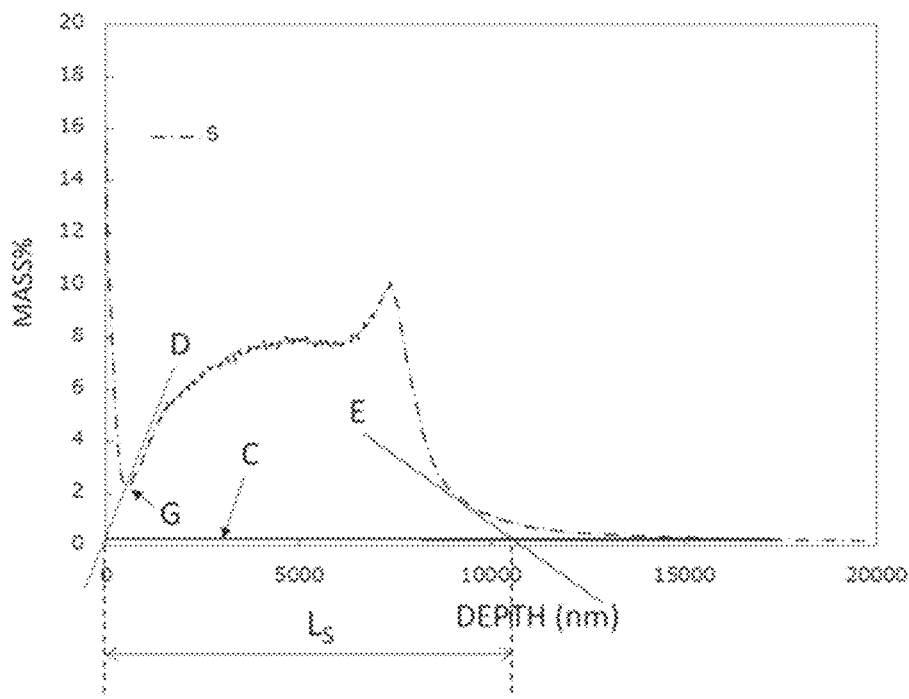
[Figure 4B]
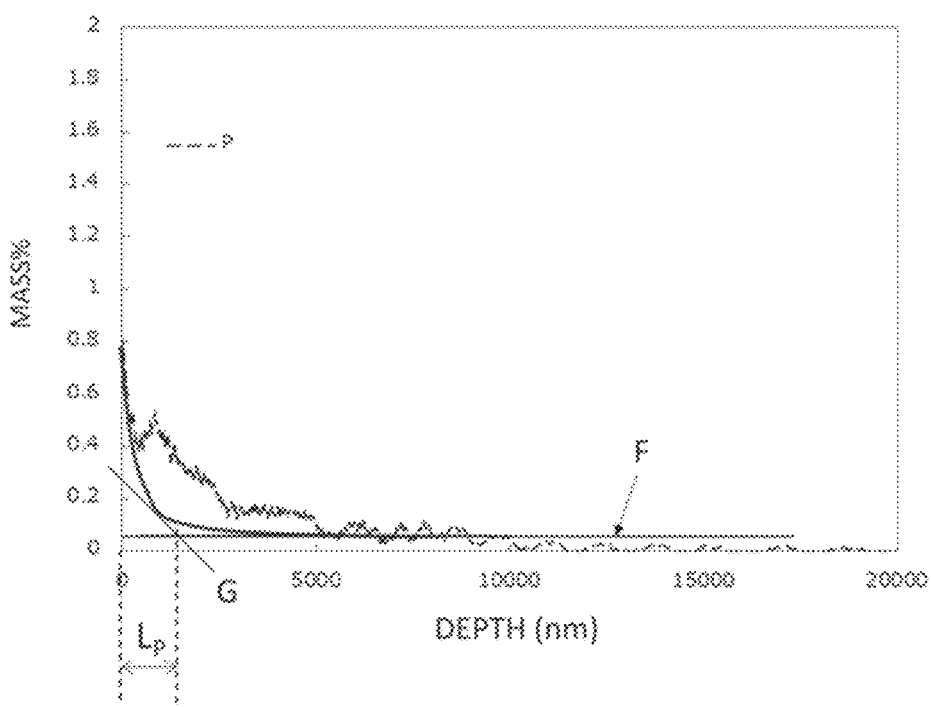

ALUMINUM MEMBER AND METHOD OF MANUFACTURING THE SAME

CROSS REFERENCE TO RELATED APPLICATIONS

The present application is a continuation application of International Patent Application No. PCT/JP2019/012582 filed on Mar. 25, 2019, which claims the benefit of Japanese Patent Application No. 2018-062726, filed on Mar. 28, 2018. The contents of these applications are incorporated herein by reference in their entirety.

BACKGROUND

Technical Field

The present disclosure relates to an aluminum member and a method of manufacturing the aluminum member.

Background

Aluminum members with opaque, white color have been demanded for applications requiring aesthetic properties such as for building materials or casings of electronic devices. Opaque, white color is a color difficult to achieve by common dyeing and coloring methods used in anodization of aluminum members. Thus, methods of manufacturing aluminum members with opaque, white color have been conventionally proposed.

Japanese Patent Application Laid-Open No. 2000-226694 discloses a method of manufacturing an aluminum member having opalescent color by performing anodization using an electrolytic solution containing phosphoric acid or sulfuric acid, the electrolytic solution being subjected to control of temperature and concentration conditions.

Japanese Patent Application Laid-Open No. 2017-25384 discloses a method of coloring an aluminum member by charging a pigment into fine pores formed by anodization.

SUMMARY

However, the conventional methods of manufacturing aluminum members with opaque, white color entail a complicated electrolytic process, such as entailing secondary or more treatment steps in some cases. Moreover, the conventional methods of manufacturing aluminum members cannot provide aluminum members having a sufficient degree of whiteness.

The inventors of the present disclosure repeated earnest studied to solve the above situation, and found that the degree of whiteness of the aluminum member was able to be increased by causing the anodized coating to contain sulfur (S) and phosphorous (P) and controlling distribution (atomic composition profile) of S and P in the depth direction of the anodized coating, to complete the present disclosure.

Moreover, it was found that the aluminum member having high degree of whiteness was able to be obtained by simple primary treatment as a result of performing anodization on the aluminum member by use of an electrolytic solution of a specific composition, to complete the present disclosure.

The present disclosure presents the following embodiments to solve the above situation.

[1] An aluminum member comprising:
a base material made of aluminum or an aluminum alloy; and
an anodized coating comprising a barrier layer on a surface of the base material and a porous layer on the barrier layer, wherein
the anodized coating contains phosphorous (P) and sulfur (S), and has a thickness of 100 μm or less, and,
in a depth direction heading from a surface of the anodized coating toward the base material, a depth providing a maximum content of S in a region situated at a depth of 500 nm or more from the surface of the anodized coating is larger than a depth providing a maximum content of P in a region situated at a depth of 0 nm or more from the surface of the anodized coating, and an inequality (the maximum content of 5)>(the maximum content of P) holds.

[2] The aluminum member according to [1], wherein, when amounts of S and P existing over the depth direction of the anodized coating are defined as $T_S$ and $T_P$, respectively, and amounts of S and P existing in the base material at the depth exceeding 100 μm and not more than 200 μm from the surface of the anodized coating are defined as $M_S$ and $M_P$, respectively, equalities hold as follows:

$T_S/M_S$=1.5 to 1500; and
$T_P/M_P$=10 to 9000.

[4] The aluminum member according to [2], wherein P in an amount of $0.9 \times T_P$ exists in a region to a depth of 1 μm from the surface of the anodized coating.

[4] A method of manufacturing the aluminum member according to [1], the method comprising:
preparing a base material made of aluminum or an aluminum alloy; and
performing anodization on the base material in an electrolytic solution comprising:
(a) a first acid being an inorganic acid or a salt of the first acid; and
(b) at least one second acid selected from a group consisting of diphosphoric acid, triphosphoric acid, and polyphosphoric acid, or a salt of the second acid.

[5] The method of manufacturing an aluminum member according to [4], wherein, in performing anodization,
a concentration of the first acid or the salt of the first acid in the electrolytic solution is 0.01 to 2.0 mol·dm$^{-3}$, and
a concentration of the second acid or the salt of the second acid in the electrolytic solution is 0.01 to 5.0 mol·dm$^{-3}$.

[6] The method of manufacturing an aluminum member according to [4], wherein, in performing anodization, the anodization is performed under conditions of a current density of 5 to 30 mA·cm$^{-2}$ and an electrolysis time of 10 to 600 minutes.

It is possible to provide an aluminum member having a high degree of whiteness by a simple primary treatment.

BRIEF DESCRIPTION OF THE DRAWINGS

FIG. 1 is a diagram schematically showing an aluminum member according to an embodiment;

FIG. 2 is a photograph taken with a scanning electron microscope (SEM) of a cross-section of an anodized coating in Example 3;

FIG. 3 is a diagram showing a result of measurement of the aluminum member in Example 3 from the surface toward the depth direction of the aluminum member by the depth profile analysis (glow discharge optical emission spectrometry/GD-OES); and FIGS. 4A and 4B are diagrams illustrating thicknesses of regions in the anodized coating where S and P are present in Example 3.

DETAILED DESCRIPTION

1. Aluminum Member

An aluminum member includes a base material and an anodized coating provided on a surface of the base material. The anodized coating includes a barrier layer on the surface of the base material and a porous layer on the barrier layer. In other words, the anodized coating includes the barrier layer and the porous layer in this order from the surface of the base material toward the surface of the anodized coating. Hereinafter, the components constituting the aluminum member according to an embodiment will be described.

(Base Material)

The base material may be composed of aluminum or may be composed of an aluminum alloy. The material of the base material can be selected as appropriate depending on the intended use of the aluminum member. For example, from the viewpoint of increasing the strength of the aluminum member, it is preferable to use 5000 series aluminum alloy or 6000 series aluminum alloy for the base material. From the viewpoint of increasing the degree of whiteness achieved after anodization, it is preferable to use, for the base material, 1000 series or 6000 series aluminum alloy resistant to coloring due to anodization.

(Anodized Coating)

The anodized coating includes a barrier layer formed on the surface of the base material and a porous layer formed on the barrier layer. The anodized coating contains P and S, and has a thickness of 100 μm or less. In the depth direction heading from the surface of the anodized coating toward the base material, the depth where the maximum content of S is provided in the region of the anodized coating located at the depth of 500 nm or more from the surface is larger than the depth where the maximum content of P is provided in the region of the anodized coating located at the depth of 0 nm or more from the surface, and the following inequality holds: (the maximum content of S) in the region of the anodized coating at the depth of 500 nm or more from the surface>(the maximum content of P) in the region of the anodized coating at the depth of 0 nm or more from the surface. The maximum contents of S and P can be measured by the glow discharge optical emission spectrometry (GD-OES). In the glow discharge optical emission spectrometry, sputtering is performed gradually in the depth direction from a surface of a sample by discharge plasma generated by glow discharge, to cause atoms in the sputtered sample to be excited and to emit light in the discharge plasma. Since light emitted by the light emission has a wavelength unique to an atom, the atom can be identified, and a content of the atom can be measured by detecting the emitted light. The atomic composition in the depth direction from the surface of the anodized coating can be measured by the glow discharge optical emission spectrometry in this manner. When the S content in the anodized coating is measured by the glow discharge optical emission spectrometry, in some cases, a peak of the S content is found in the region at the depth of less than 500 nm from the surface of the anodized coating. It is considered, however, that such an S content in the anodized coating is affected from the components of the electrolytic solution and does not indicate the actual S content in the anodized coating. Therefore, the peak of the S content existing in the region at the depth of less than 500 nm from the surface of the anodized coating is not an equivalent of (the maximum content of S) described above. On the other hand, when the P content in the anodized coating is measured by the glow discharge optical emission spectrometry, the maximum content of P in all regions of the anodized coating at the depth of 0 nm or more from the surface of the anodized coating is measured. This is because, since the measurement result of the P content near the surface of the anodized coating is considered not to be affected by the components of the electrolytic solution, and to indicate the actual P content in the anodized coating.

If the thickness of the anodized coating is more than 100 μm, the electrolysis time for forming the anodized coating is lengthened, so that the production efficiency is reduced; in addition, unevenness occurs due to heterogeneous growth, thus causing appearance defect. In an example of the anodized coating, since S and P are distributed as described above in the depth direction of the anodized coating, on the barrier layer side of the porous layer, first pores extending substantially perpendicular to the surface of the barrier layer are situated, and on the surface side of the porous layer, second pores are situated. The second pores spread radially toward the surface of the porous layer to form an inversed dendritic pattern. This is considered because the contents of S and P in the porous layer have huge effect in forming the first and second pores; therefore, in the region with the high S content, side walls surrounding the first pores are preferentially formed to be substantially perpendicular to the surface of the barrier layer, whereas in the region with the high P content, side walls surrounding the second pores are formed to have tilted angles to the surface of the barrier layer. The aluminum member like this, due to having the second pores in the porous layer, allows light entering the porous layer to be diffused by irregular reflection; thus, the degree of whiteness of the aluminum member can be increased. On the other hand, when the aluminum member does not include the second pores, a porous layer having the first pores in a regular pattern extending substantially perpendicular to the surface of the barrier layer is formed. Consequently, a coating structure irregularly reflecting light cannot be obtained and the degree of whiteness of the aluminum member is reduced; therefore, the desired degree of whiteness is unavailable.

It is preferable that the anodized coating have a thickness of 6 to 100 μm. Due to the thickness of the anodized coating falling within these ranges, the aluminum member can be provided with the even and uniform anodized coating and can have good aesthetic properties. The thickness of the porous layer is preferably 6 μm or more and less than 100 m, more preferably 8 to 75 μm, even more preferably 10 to 50 μm. Due to the thickness of the porous layer falling within these ranges, the aluminum member has a suitable opaque, white color and can have good aesthetic properties. It is preferable that the barrier layer have a thickness of 10 to 150 nm. The barrier layer can, due to having the above thicknesses, prevent coloring by interference and increase the degree of whiteness.

FIG. 1 is a schematic diagram showing an aluminum member according to an embodiment. As shown in FIG. 1, an anodized coating 2 is formed on a surface of a base material 1 made of aluminum or an aluminum alloy. The anodized coating 2 includes a barrier layer 3 on the surface of the base material 1 and a porous layer 4 on the barrier layer 3. FIG. 1 is a schematic diagram and pore structures in the porous layer 4 are schematically shown in FIG. 1. Consequently, though the first and second pores exist in the porous layer 4 in FIG. 1, the structures of the first and second pores are not shown in detail in FIG. 1.

FIG. 2 is a photograph taken with a scanning electron microscope (SEM) of a cross-section of an anodized coating in Example 3, which will be described later. As shown in FIG. 2, on the barrier layer side of the porous layer 4, first pores 6 extending perpendicular to the surface of the barrier layer 3 are situated. On the surface side of the porous layer 4, second pores 5 are situated. The second pores 5 are present in such a manner as to be connected to the respective first pores 6. The second pores 5 spread radially to form an inversed dendritic pattern.

The brightness by Hunter of the aluminum member, as measured from the surface of the anodized coating, is preferably 60 to 90, more preferably 75 to 90, even more preferably 80 to 90. The "brightness by Hunter" refers to a numerical value obtained according to JIS P 8123. The higher the brightness by Hunter is, the higher the whiteness is. When the brightness by Hunter of the aluminum member is 60 to 90, the aluminum member has a suitable opaque, white color and can have good aesthetic properties.

Supposing that the contents of S and P existing over the depth direction of the anodized coating are represented as $T_S$ and $T_P$, respectively, and the contents of S and P existing in the base material having the depth exceeding 100 μm and not more than 200 μm from the surface of the anodized coating are represented as $M_S$ and $M_P$ respectively, it is preferable that the following equalities hold:

$T_S/M_S$=1.5 to 1500; and
$T_P/M_P$=10 to 9000.

These $T_S$, $M_S$, $T_P$ and $M_P$ can be measured by the aforementioned glow discharge optical emission spectrometry (GD-OES). The measuring method of $T_S$, $M_S$, $T_P$ and $M_P$ by the glow discharge optical emission spectrometry will be described in detail in Examples. The thickness of the anodized coating is 100 μm or less. Consequently, when measurement is performed by the glow discharge optical emission spectrometry in the region of the aluminum member at the depth exceeding 100 μm and not more than 200 μm from the surface of the anodized coating, the region is a region of the base material.

Due to $T_S/M_S$ and $T_P/M_P$ falling within the above ranges of numerical values, the first pores and the second pores can be stably formed. Consequently, irregular reflection of light in the second pores of the aluminum member can be performed more effectively, to increase the degree of whiteness of the aluminum member effectively. It is more preferable that $T_S/M_S$=80 to 800. It is even more preferable that $T_P/M_P$=50 to 500. Since $T_S/M_S$ and $T_P/M_P$ fall within the above ranges of numerical values, it is possible to sufficiently grow the porous layer to a certain thickness and to form an inversed dendritic pattern layer having a sufficient branched structure and second pores in a regular pattern in the porous layer, to effectively increase the degree of whiteness. It is preferable that $T_S$ have 500 to 1000000 mass %, more preferably 1000 to 50000 mass %, even more preferably 5000 to 20000 mass %. It is preferable that $T_P$ have 35 to 90000 mass %, more preferably 50 to 45000 mass %, even more preferably 800 to 25000 mass %. It is preferable that $M_S$ have 50 to 1000 mass %. It is preferable that $M_P$ have 4 to 20 mass %. As will be described later in Examples, each of $T_S$, $M_S$, $T_P$ and $M_P$, due to being expressed as an integrated value of the content of S or P in the depth direction, has possibility of exceeding 100 mass %.

It is preferable that P in the amount of $0.9 \times T_P$ exists in the region to the depth of 1 μm from the surface of the anodized coating. Thus, due to most of P existing near the surface of the anodized coating, the anodized coating can have an internal structure suitable to irregular reflection of incident light. Consequently, the degree of whiteness of the aluminum member can be further increased.

2. Method of Manufacturing Aluminum Member

A method of manufacturing an aluminum member according to an embodiment includes preparing a base material and performing anodization on the base material. To accomplish anodization, it is conventionally necessary to perform a primary treatment and a secondary treatment using an electrolytic solution different from that used in the primary treatment. In some cases, it may be necessary to further perform tertiary or more treatments using different electrolytic solutions. By contrast, with the method of manufacturing an aluminum member according to an embodiment, an aluminum member having a high degree of whiteness can be provided by a primary treatment simpler than conventional treatments. Hereinafter, each step will be described in detail.

(Step of Preparing Base Material)

First, a base material made of aluminum or an aluminum alloy is prepared. Examples of the aluminum alloy include, but are not limited to, 1000 series aluminum alloy, 5000 series aluminum alloy, and 6000 series aluminum alloy.

(Step of Performing Anodization on Base Material)

The conditions of the anodization are set to conditions allowing the formation of an anodized coating having a thickness of 100 μm or less, the anodized coating including: a barrier layer provided on a surface of the base material; and a porous layer provided on the barrier layer. The anodized coating contains P and S; in the depth direction heading from the surface of the anodized coating toward the base material, the depth where the maximum content of S is provided in the region at the depth of 500 nm or more from the surface of the anodized coating is larger than the depth where the maximum content of P is provided in the region at the depth of 0 nm or more from the surface of the anodized coating, and the following inequality holds: (the maximum content of 5) in the region at the depth of 500 nm or more from the surface of the anodized coating>(the maximum content of P) in the region at the depth of 0 nm or more from the surface of the anodized coating. On this occasion, in the method of manufacturing the aluminum member in an embodiment, the first and second pores are formed in the porous layer. The first pores are pores situated on the barrier layer side and extending in the thickness direction of the porous layer. The second pores are pores situated on the surface side of the porous layer and branching to extend radially in the thickness direction of the porous layer toward the surface of the porous layer.

A surface treatment such as degreasing or polishing may, if necessary, be performed on the base material before the anodization. For example, when alkaline degreasing is performed as the surface treatment, the gloss value of the anodized coating can be reduced to obtain an aluminum member exhibiting a white color without luster. When polishing such as chemical polishing, mechanical polishing, or electrolytic polishing is performed as the surface treatment, the gloss value achieved after the anodization can be increased to obtain an aluminum member exhibiting a white color with luster. From the viewpoint of further increasing the degree of whiteness and gloss value of the resulting aluminum member, it is preferable to perform electrolytic polishing on the base material before the anodization.

For anodization, an electrolytic solution is used, the electrolytic solution containing: a first acid being an inorganic acid or a salt of the first acid; and at least one second acid selected from a group consisting of diphosphoric acid, triphosphoric acid, and polyphosphoric acid, or a salt of the second acid. The first acid being the inorganic acid, or the salt of the first acid has the effect of causing the formation and dissolution of a coating on depressions in the surface of the barrier layer and forming pores extending substantially perpendicular to a thickness direction of the coating. Since the reaction proceeds at the interface between the aluminum base and the anodized coating, as described above, the anodized coating grows while S contained in the first acid is taken into the anodized coating in the porous layer present on the aluminum base side. Accordingly, the depth in the anodized coating where S has the maximum content is situated on the base material side of the anodized coating.

On the other hand, the second acid selected from the group consisting of diphosphoric acid, triphosphoric acid, and polyphosphoric acid, or the salt of the second acid has the effect of forming a structure extending in a fibrous form on the wall surfaces of the depressions. Since the reaction proceeds on the surface of the anodized coating, as described above, P contained in the second acid is taken into the surface side of the anodized coating in the porous layer appearing on the surface of the aluminum member. Accordingly, the depth in the anodized coating where P has the maximum content is situated on the surface side of the anodized coating. As a result, in the anodized coating, the depth providing the maximum content of S is larger than the depth providing the maximum content of P, and the following inequality holds: (the maximum content of S)>(the maximum content of P). It is then considered that in the method of manufacturing an aluminum member according to an embodiment, the use of the electrolytic solution including the first acid or the salt of the first acid and the second acid or the salt of the second acid allows these substances to act synergistically to form the porous layer including the first and second pores.

Examples of the inorganic acid as the first acid and salts of the inorganic acid include, but are not limited to, at least one substance selected from the group consisting of: inorganic acids, such as sulfurous acid, sulfuric acid, thiosulfuric acid and disulfuric acid and the salts of the inorganic acids; and sulfates, such as sodium sulfate, ammonium sulfate and sodium thiosulfate.

It is preferable to use, as acid anhydrides being the second acid and salts of the acid anhydrides, at least one substance selected from the group consisting of diphosphoric acid, triphosphoric acid, and polyphosphoric acid and the salts of these acid anhydrides in order to allow reliable formation of the second pores in a regular shape.

The concentration of the first acid or the salt of the first acid in the electrolytic solution is set to preferably 0.01 to 2.0 mol·dm$^{-3}$, more preferably 0.05 to 1.5 mol·dm$^{-3}$. If the concentration of the first acid and the salt of the first acid is 0.01 mol·dm$^{-3}$ or more, the anodization of the base material can be effectively accomplished, and if the concentration is 2.0 mol·dm$^{-3}$ or less, the dissolving power of the electrolytic solution is not increased, so that it is possible to effectively grow the porous layer.

The concentration of the second acid or the salt of the second acid in the electrolytic solution is set to preferably 0.01 to 5.0 mol·dm$^{-3}$, more preferably 0.1 to 2.5 mol·dm$^{-3}$. Due to the concentration of the second acid or the salt of the second acid being 0.01 mol·dm$^{-3}$ or more, it is possible to effectively form the second pores in the porous layer; if the concentration is 5.0 mol·dm$^{-3}$ or less, it is possible to periodically form the second pores, to thereby form the porous layer having the effective thickness. Thus, when the concentration of the second acid or the salt of the second acid is set to 0.01 to 5.0 mol·dm$^{-3}$, the porous layer can be sufficiently grown to a certain thickness, and the second pores can be formed periodically in the porous layer, so that the degree of whiteness of the aluminum member can be increased.

The current density in the anodization is preferably 5 to 30 mA·cm$^{-2}$, more preferably 5 to 20 mA·cm$^{-2}$, even more preferably 10 to 20 mA·cm$^{-2}$. When the current density is set to 5 mA·cm$^{-2}$ or more, the rate of growth of the porous layer can be increased to achieve a sufficient coating thickness. When the current density is set to 30 mA·cm$^{-2}$ or less, the anodic oxidation reaction proceeds uniformly, so that the occurrence of discoloration or white color unevenness can be prevented.

The temperature of the electrolytic solution in the anodization is preferably 0 to 80° C., more preferably 20 to 60° C. When the temperature of the electrolytic solution is 0° C. or higher, the second pores can be easily formed, and when the temperature of the electrolytic solution is 80° C. or lower, the porous layer is dissolved at a moderate rate to give a large coating thickness, so that the degree of whiteness of the aluminum member can be increased.

Additionally, the electrolysis time in the anodization is preferably 10 to 600 minutes, more preferably 30 to 300 minutes, even more preferably 30 to 120 minutes. When the electrolysis time is 10 minutes or more, the anodized coating can have the effective thickness, and when the electrolysis time is 600 minutes or less, the production efficiency can be increased.

Post-treatment such as pore sealing may, if necessary, be performed after the anodization is performed on the base material.

EXAMPLES

Hereinafter, the present disclosure will be described in detail based on Examples. The present disclosure is not limited to the examples presented below, and modifications can be made as appropriate without departing from the gist of the present disclosure.

Base materials made of aluminum alloys were prepared under the conditions listed in Table 1 below, and anodization was performed on the base materials to produce aluminum members of Examples 1 to 32 and Comparative Examples 1 to 2.

TABLE 1

| Sample | Type of Base Material Alloy | Surface Treatment on Base Material | First Acid or Salt of First Acid | | Second Acid or Salt of Second Acid | | Conditions of Anadization | | |
|---|---|---|---|---|---|---|---|---|---|
| | | | Kind | Concentration (mol dm$^{-3}$) | Kind | Concentration (mol dm$^{-3}$) | Temperature of Electrolytic Solution (° C.) | Current Density (mAcm$^{-2}$) | Electrolysis Time (minutes) |
| Example 1 | 1100 | Alkaline Degreasing | Sulfuric Acid | 0.5 | Diphosphoric Acid | 0.2 | 20 | 10 | 60 |
| Example 2 | 1100 | Alkaline Degreasing | Thiosulforic Acid | 0.5 | Diphosphoric Acid | 0.2 | 20 | 10 | 60 |

TABLE 1-continued

| Sample | Type of Base Material Alloy | Surface Treatment on Base Material | First Acid or Salt of First Acid Kind | Concentration (mol dm$^{-3}$) | Second Acid or Salt of Second Acid Kind | Concentration (mol dm$^{-3}$) | Conditions of Anadization Temperature of Electrolytic Solution (° C.) | Current Density (mAcm$^{-2}$) | Electrolysis Time (minutes) |
|---|---|---|---|---|---|---|---|---|---|
| Example 3 | 1100 | Alkaline Degreasing | Sodium Sulfate | 0.5 | Diphosphoric Acid | 0.2 | 20 | 10 | 60 |
| Example 4 | 1100 | Alkaline Degreasing | Sulfuric Acid | 0.5 | Triphosphoric Acid | 0.2 | 60 | 150 | 60 |
| Example 5 | 1100 | Alkaline Degreasing | Sulfuric Acid | 0.5 | Polyphosphoric Acid | 0.2 | 60 | 150 | 60 |
| Example 6 | 1100 | Alkaline Degreasing | Sulfuric Acid | 0.005 | Diphosphoric Acid | 0.2 | 20 | 10 | 60 |
| Example 7 | 1100 | Alkaline Degreasing | Sulfuric Acid | 0.01 | Diphosphoric Acid | 0.2 | 20 | 10 | 60 |
| Example 8 | 1100 | Alkaline Degreasing | Sulfuric Acid | 0.05 | Diphosphoric Acid | 0.2 | 20 | 10 | 60 |
| Example 9 | 1100 | Alkaline Degreasing | Sulfuric Acid | 1.5 | Diphosphoric Acid | 0.2 | 20 | 10 | 60 |
| Example 10 | 1100 | Alkaline Degreasing | Sulfuric Acid | 2 | Diphosphoric Acid | 0.2 | 20 | 10 | 60 |
| Example 11 | 1100 | Alkaline Degreasing | Sulfuric Acid | 7 | Diphosphoric Acid | 0.2 | 20 | 10 | 60 |
| Example 12 | 1100 | Alkaline Degreasing | Sulfuric Acid | 0.5 | Diphosphoric Acid | 0.005 | 20 | 10 | 60 |
| Example 13 | 1100 | Alkaline Degreasing | Sulfuric Acid | 0.5 | Diphosphoric Acid | 0.01 | 20 | 10 | 60 |
| Example 14 | 1100 | Alkaline Degreasing | Sulfuric Acid | 0.5 | Diphosphoric Acid | 0.1 | 20 | 10 | 60 |
| Example 15 | 1100 | Alkaline Degreasing | Sulfuric Acid | 0.5 | Diphosphoric Acid | 2.5 | 20 | 10 | 60 |
| Example 16 | 1100 | Alkaline Degreasing | Sulfuric Acid | 0.5 | Diphosphoric Acid | 5 | 20 | 10 | 60 |
| Example 17 | 1100 | Alkaline Degreasing | Sulfuric Acid | 0.5 | Diphosphoric Acid | 10 | 20 | 10 | 60 |
| Example 18 | 1100 | Alkaline Degreasing | Sulfuric Acid | 0.5 | Diphosphoric Acid | 0.2 | 0 | 10 | 60 |
| Example 19 | 1100 | Alkaline Degreasing | Sulfuric Acid | 0.5 | Diphosphoric Acid | 0.2 | 40 | 10 | 60 |
| Example 20 | 1100 | Alkaline Degreasing | Sulfuric Acid | 0.5 | Diphosphoric Acid | 0.2 | 60 | 10 | 60 |
| Example 21 | 1100 | Alkaline Degreasing | Sulfuric Acid | 0.5 | Diphosphoric Acid | 0.2 | 80 | 10 | 60 |
| Example 22 | 1100 | Alkaline Degreasing | Sulfuric Acid | 0.5 | Diphosphoric Acid | 0.2 | 20 | 2 | 60 |
| Example 23 | 1100 | Alkaline Degreasing | Sulfuric Acid | 0.5 | Diphosphoric Acid | 0.2 | 20 | 5 | 60 |
| Example 24 | 1100 | Alkaline Degreasing | Sulfuric Acid | 0.5 | Diphosphoric Acid | 0.2 | 20 | 20 | 60 |
| Example 25 | 1100 | Alkaline Degreasing | Sulfuric Acid | 0.5 | Diphosphoric Acid | 0.2 | 20 | 30 | 60 |
| Example 28 | 1100 | Alkaline Degreasing | Sulfuric Acid | 0.5 | Diphosphoric Acid | 0.2 | 20 | 50 | 60 |
| Example 27 | 6063 | Alkaline Degreasing | Sulfuric Acid | 0.5 | Diphosphoric Acid | 0.2 | 20 | 10 | 60 |
| Example 28 | 1100 | Alkaline Degreasing | Sulfuric Acid | 0.5 | Diphosphoric Acid | 0.2 | 20 | 10 | 10 |
| Example 29 | 1100 | Alkaline Degreasing | Sulfuric Acid | 0.5 | Diphosphoric Acid | 0.2 | 20 | 10 | 30 |
| Example 30 | 1100 | Alkaline Degreasing | Sulfuric Acid | 0.5 | Diphosphoric Acid | 0.2 | 20 | 10 | 120 |
| Example 31 | 1100 | Alkaline Degreasing | Sulfuric Acid | 0.5 | Diphosphoric Acid | 0.2 | 20 | 10 | 800 |
| Example 32 | 1100 | Alkaline Degreasing | Sulfuric Acid | 0.5 | Diphosphoric Acid | 0.2 | 20 | 10 | 700 |
| Comparative Example 1 | 1100 | Alkaline Degreasing | Sulfuric Acid | 0.5 | Diphosphoric Acid | 0.2 | 20 | 10 | 0 |
| Comparative Example 2 | 1100 | Alkaline Degreasing | — | — | Diphosphoric Acid | 0.2 | 20 | 10 | 60 |

Thereafter, various measurements were conducted on the aluminum members of Examples 1 to 32 and Comparative Examples 1 and 2, and the measurement results were evaluated. These measurement results and evaluation results are shown in Table 2. The brightness by Hunter, white color unevenness, confirmation of the first and second pores, the depth profile analysis on the atomic composition of the aluminum member, the thickness of the region where S exists and the thickness of the region where P exists were measured as described below. In "determination" of Table 2, cases in which the second pores are present, and the white color unevenness was "Average" or "Good" were rated "Good," and other cases were rated "Poor."
<Brightness by Hunter>

L*a*b* as standardized by International Commission on Illumination (CIE) and specified in JIS Z 8781-4: 2013 were measured with a colorimeter, and evaluation was made using a brightness by Hunter calculated by the following equation.

$$\text{Brightness by Hunter}=100-\{(100-L^*)^2+a^{*2}+b^{*2}\})^{1/2}$$

<White Color Unevenness>

Samples subjected to anodization were visually examined for the appearance: A sample uniformly anodized was rated "Good," a sample with slight white color unevenness was rated "Average," and a sample suffering considerable white color unevenness or not anodized was rated "Poor."

<Confirmation of First and Second Pores>

Whether or not the barrier layer, the porous layer, the first and second pores in the porous layer were present was measured using results obtained by observing the surface and cross-section of the anodized coating with an FE-SEM (SU-8230, manufactured by Hitachi, Ltd.). In the cross-sectional observation, a crack caused in the coating by bending the sample subjected to anodization in a V-shape was observed at an angle to the crack.

<Depth Profile Analysis on Atomic Composition of Aluminum Member>

The depth profile analysis on the atomic composition of the aluminum member was conducted by use of the glow discharge optical emission spectrometry (GD-OES). As the measurement machine, GDA750 manufactured by Spectruma Analytik GmbH was used; sputtering was performed by Argon gas (gas pressure of 350 Pa) with an anode diameter of 2.5 mm and an output of 25 W, to measure emission intensity from various (Al, O, S, P, H) elements. The data acquisition time was 0.005 seconds/a piece of data. By converting a graph of obtained emission intensity vs. sputtering rate using a surface and depth profile analysis (SDPA) application, a graph of mass % concentration vs. depth is obtained. Hereinafter, by using the obtained graph, measurement procedures of (the maximum content of S), (the maximum content of P), $T_S$, $M_S$, $T_P$ and $M_P$ will be described in detail.

The atomic composition of the aluminum member was measured from the surface of the anodized coating toward the depth direction at least to the depth of 200 μm by the glow discharge optical emission spectrometry. In the anodized coating, (the maximum content of S) in the region at the depth from the surface of 500 nm or more and (the maximum content of P) in the region at the depth from the surface of 0 nm or more were measured. The integrated value of the content of P from the surface of the anodized coating to the interface with the base material was defined as $T_P$. On the other hand, as described above, it is considered that the content measured near the surface of the anodized coating was affected by the components of the electrolytic solution. Therefore, the integrated value of the S content in the depth direction of the anodized coating from a first downwardly projecting inflection point of the peak of the S content observed in the region at the depth of 1 nm or more from the surface of the anodized coating to the interface with the base material was defined as $T_S$. For example, in FIG. 4A, the first projecting inflection point in the anodized coating is represented as G, and $T_S$ is the integrated value of the content of S existing all over the region deeper than G in the anodized coating. In other words, $T_S$ is, in the anodized coating, the integrated value of the S content existing all over the depth direction from G to the interface with the base material. The integrated values of the contents of S and P in the region of the base material exceeding 100 μm and not more than 200 μm from the surface of the anodized coating were defined as $M_S$ and $M_P$, respectively. From $T_S$, $M_S$, $T_P$ and $M_P$ obtained as described above, $T_S/M_S$ and $T_P/M_P$ were calculated. Based on the obtained result of the depth profile analysis on P, the case where $0.9 \times T_P$ exists in the region at the depth to 1 μm from the surface of the anodized coating was rated "Good," and the case where $0.9 \times T_P$ does not exist in the region at the depth to 1 μm from the surface of the anodized coating was rated "Poor." The evaluation results are described in the field of "$0.9 \times T_P$" in Table 2.

FIG. 3 is a diagram showing a result of measurement of the atomic composition of the aluminum member in Example 3 from the surface toward the depth direction of the aluminum member by the depth profile analysis (glow discharge optical emission spectrometry/GD-OES), and the diagram shows the measurement result of the atomic composition of the aluminum member from the surface to the depth of 20 μm of the anodized coating. In FIG. 3, regarding the peak increasing the content of S, two peaks, namely, a first peak near the surface of the anodized coating and a second peak situated at the depth of about 7500 nm from the surface of the anodized coating exist. However, as described above, since (the maximum content of S) is defined as the maximum content of S in the region at the depth of 500 nm or more from the surface of the anodized coating, the first peak is excluded and the second peak serves as a peak providing (the maximum content of S). The peak providing (the maximum content of S) is indicated with A in FIG. 3. On the other hand, since the maximum content of P is measured in all over the region in the depth direction of the anodized coating, the peak of the maximum content of P is situated near the surface of the anodized coating. The peak providing the maximum content of P is indicated with B in FIG. 3.

<Thickness of Region where S Exists and Thickness of Region where P Exists in Anodized Coating>

As described above, by the glow discharge optical emission spectrometry, the profile of the atomic composition to the interface with the base material was measured from the surface of the anodized coating toward the depth direction.

Thereafter, for "the thickness of the region where S exists in the anodized coating," in the profile of the atomic composition, tangent lines were drawn from the peaks of the content of S, and two intersection points where the tangent lines intersect a baseline of S were measured. The distance between the two intersection points was calculated as "the thickness of the region where S exists in the anodized coating."

For "the thickness of the region where P exists in the anodized coating," in the profile of the atomic composition, tangent lines were drawn from the peaks of the content of P, and two intersection points where the tangent lines intersect a baseline of P were measured. The distance between the two intersection points was calculated as "the thickness of the region where P exists in the anodized coating."

From "the thickness of the region where S exists in the anodized coating" and "the thickness of the region where P exists in the anodized coating" as calculated above, (the thickness of the region where S exists in the anodized coating)–(the thickness of the region where P exists in the anodized coating) was calculated.

FIGS. 4A and 4B are diagrams showing the peaks providing the maximum content of S and the peak providing the maximum content of P in FIG. 3, respectively. As shown in FIG. 4A, two intersection points of the tangent lines D and E from the peaks with the baseline C are calculated, and as the distance between the two intersection points, (the thickness of the region where S exists in the anodized coating) $L_S$ is calculated. As shown in FIG. 4B, an intersection point of the tangent line G from the peak with the baseline F is calculated, and as the distance between the surface of the anodized coating and the intersection point, (the thickness of the region where P exists in the anodized coating) $L_P$ is calculated. By providing $L_S$–$L_P$, (the thickness of the region where S exists in the anodized coating)–(the thickness of the region where P exists in the anodized coating) is calculated. Calculation of $L_S$ and $L_P$ can be performed by software included with GDA750 manufactured by Spectruma Analytik GmbH.

layer formed on the barrier layer, and the porous layer included the first and second pores. According to the results of the depth profile analysis on the atomic compositions of the aluminum members in Examples 1 to 32, the depth providing the maximum content of S in the region located at the depth of 500 nm or more from the surface of the anodized coating was larger than the depth providing the maximum content of P in the region located at the depth of 0 nm or more from the surface, and the following inequality held: (the maximum content of S)>(the maximum content of P). Moreover, in Examples 1 to 32, it was possible to produce the aluminum member of the present disclosure by performing the anodization on the prepared base material made of an aluminum alloy in the electrolytic solution

TABLE 2

| | Depth Profile Analysis | | | Thickness | Appearance Properties | | | | |
|---|---|---|---|---|---|---|---|---|---|
| | Existing Amount (times) | | | (μm) | White Color | Brightness | First | Second | |
| Sample | $T_S/M_S$ | $T_P/M_P$ | $0.9 \times T_P$ | $L_S - L_P$ | Unevenness | by Hunter | Pores | Pores | Determination |
| Example 1 | 120 | 320 | Good | 10 | Good | 85 | Present | Present | Good |
| Example 2 | 120 | 320 | Good | 10 | Good | 85 | Present | Present | Good |
| Example 3 | 120 | 320 | Good | 10 | Good | 85 | Present | Present | Good |
| Example 4 | 130 | 330 | Good | 11 | Good | 85 | Present | Present | Good |
| Example 5 | 140 | 310 | Good | 11 | Good | 85 | Present | Present | Good |
| Example 6 | 1.2 | 320 | Good | 4 | Average | 65 | Present | Present | Good |
| Example 7 | 2.5 | 315 | Good | 9 | Good | 83 | Present | Present | Good |
| Example 8 | 15 | 330 | Good | 10 | Good | 84 | Present | Present | Good |
| Example 9 | 400 | 325 | Good | 11 | Good | 84 | Present | Present | Good |
| Example 10 | 520 | 315 | Good | 11 | Good | 81 | Present | Present | Good |
| Example 11 | 1800 | 315 | Good | 35 | Average | 90 | Present | Present | Good |
| Example 12 | 120 | 6 | Good | 8 | Average | 65 | Present | Present | Good |
| Example 13 | 130 | 15 | Good | 9 | Good | 70 | Present | Present | Good |
| Example 14 | 140 | 170 | Good | 12 | Good | 75 | Present | Present | Good |
| Example 15 | 120 | 4200 | Good | 14 | Good | 77 | Present | present | Good |
| Example 16 | 135 | 8000 | Good | 13 | Good | 83 | Present | Present | Good |
| Example 17 | 130 | 15000 | Good | 11 | Good | 89 | Present | Present | Good |
| Example 18 | 150 | 350 | Good | 5 | Good | 72 | Present | Present | Good |
| Example 19 | 120 | 300 | Good | 11 | Good | 74 | Present | Present | Good |
| Example 20 | 110 | 280 | Good | 10 | Good | 76 | Present | Present | Good |
| Example 21 | 100 | 270 | Good | 10 | Good | 80 | Present | Present | Good |
| Example 22 | 70 | 250 | Good | 3 | Average | 65 | Present | Present | Good |
| Example 23 | 100 | 300 | Good | 5 | Good | 70 | Present | Present | Good |
| Example 24 | 130 | 320 | Good | 29 | Good | 75 | Present | Present | Good |
| Example 25 | 200 | 350 | Good | 44 | Good | 80 | Present | Present | Good |
| Example 26 | 1000 | 400 | Good | 70 | Good | 90 | Present | Present | Good |
| Example 27 | 110 | 350 | Good | 11 | Good | 84 | Present | Present | Good |
| Example 28 | 20 | 50 | Good | 5 | Average | 65 | Present | Present | Good |
| Example 29 | 80 | 150 | Good | 11 | Good | 80 | Present | Present | Good |
| Example 30 | 250 | 350 | Good | 24 | Good | 83 | Present | Present | Good |
| Example 31 | 1200 | 350 | Good | 99 | Good | 85 | Present | Present | Good |
| Example 32 | 1500 | 350 | Good | 99 | Good | 87 | Present | Present | Good |
| Comparative Example 1 | Undetectable | Undetectable | Poor | Incalculable | Poor | 59 | Absent | Absent | Poor |
| Comparative Example 2 | — | 350 | Poor | Incalculable | Poor | 54 | Absent | Absent | Poor |

FIG. 2 is a photograph taken with the SEM of a cross-section of the aluminum member produced in Example 3. As shown in FIG. 2, it is seen that in the aluminum member of Example 3, the anodized coating including the barrier layer 3 and the porous layer 4 on the barrier layer 3 is formed. It is also seen that the first pores 6 and second pores 5 are formed in the anodized coating.

In Examples 1 to 32, aluminum members were produced which included a base material made of an aluminum alloy and an anodized coating provided on a surface of the base material and having a thickness of 100 μm or less. The anodized coatings of Examples 1 to 32 included a barrier layer formed on the surface of the base material and a porous containing: the first acid being the inorganic acid or the salt of the first acid; and the second acid selected from the group consisting of diphosphoric acid, triphosphoric acid, and polyphosphoric acid, or the salt of the second acid. Consequently, in the aluminum members of Examples 1 to 32, S and P existed in the anodized coating, the white color unevenness was rated "Average" or "Good," and the high brightness by Hunter was provided; therefore, the aluminum members with excellent appearance properties were able to be obtained.

By contrast, in Comparative Example 1, where the base material was not subjected to anodization in a solution of sulfuric acid and diphosphoric acid, no porous layer was formed; therefore, the rating for white color unevenness was "Poor," and the brightness by Hunter was low.

Likewise, in Comparative Example 2, where the electrolytic solution contained no sulfuric acid (the first acid or the salt of the first acid), anodization of the base material was not accomplished. Consequently, no porous layer was formed, the rating for white color unevenness was "Poor," and the brightness by Hunter was low.

What is claimed is:

1. An aluminum member comprising:
   a base material made of aluminum or an aluminum alloy; and
   an anodized coating comprising a barrier layer on a surface of the base material and a porous layer on the barrier layer, wherein
   the anodized coating contains phosphorous (P) and sulfur (S), and has a thickness of 100 μm or less,
   in a depth direction heading from a surface of the anodized coating toward the base material, a depth providing a maximum content of S in a region situated at a depth of 500 nm or more from the surface of the anodized coating is larger than a depth providing a maximum content of P in a region situated at a depth of 0 nm or more from the surface of the anodized coating, and an inequality (the maximum content of S in the region of the anodized coating located at the depth of 500 nm or more from the surface of the anodized coating)>(the maximum content of P in the region situated at a depth of 0 nm or more from the surface of the anodized coating) holds,
   when amounts of S anal P existing over the depth direction of the anodized coating are defined as $T_S$ and $T_P$, respectively, and amounts of S and P existing in the base material at the depth exceeding 100 μm and not more than 200 μm from the surface of the anodized coating are defined $M_S$ and $M_P$, respectively, equalities hold as follows:
   $T_S/M_S$=1.5 to 1500; and
   $T_P/M_P$=10 to 9000, wherein each of $T_S$, $M_S$, $T_P$ and $M_P$ is expressed as an integrated value of the amount S or P, respectively, in the depth direction.

2. The aluminum member according to claim 1, wherein P in an amount of $0.9 \times T_P$ exists in a region from the surface of the anodized coating to a depth of 1 μm of the anodized coating.

3. A method of manufacturing the aluminum member according to claim 1, the method comprising:
   preparing the base material made of aluminum or an aluminum alloy; and
   performing anodization on the base material by using an electrolytic solution, the electrolytic solution comprising:
   (a) a first acid being an inorganic acid or a salt of the first acid, wherein the first acid contains S; and
   (b) at least one second acid selected from a group consisting of diphosphoric acid, triphosphoric acid, and polyphosphoric acid, or a salt of the second acid.

4. The method of manufacturing an aluminum member according to claim 3, wherein, in performing anodization, a concentration of the first acid or the salt of the first acid in the electrolytic solution is 0.01 to 2.0 mol·dm$^{-3}$, and
   a concentration of the second acid or the salt of the second acid in the electrolytic solution is 0.01 to 5.0 mol·dm$^{-3}$.

5. The method of manufacturing an aluminum member according to claim 3, wherein, in performing anodization, the anodization is performed under conditions of a current density of 5 to 30 mA·cm$^{-2}$ and an electrolysis time of 10 to 600 minutes.

* * * * *